United States Patent [19]

Schneider

[11] 4,217,697

[45] Aug. 19, 1980

[54] STAMP GAUGE

[76] Inventor: Henry G. Schneider, 81 Passaic Valley Rd., Montville, N.J. 07045

[21] Appl. No.: 962,391

[22] Filed: Jan. 2, 1979

[51] Int. Cl.$^2$ .............................................. G01B 5/00
[52] U.S. Cl. ................................................. 33/174 K
[58] Field of Search ......................... 33/174 K, 199 R

[56] References Cited

U.S. PATENT DOCUMENTS

| 318,051 | 5/1885 | Starrett | 33/199 R |
|---|---|---|---|
| 1,145,959 | 7/1915 | Amstatz | 33/174 K |
| 3,396,472 | 8/1968 | Moss | 33/199 R |

FOREIGN PATENT DOCUMENTS

| 15033 | of 1896 | United Kingdom | 33/174 K |
|---|---|---|---|
| 389756 | 3/1933 | United Kingdom | 33/174 K |

Primary Examiner—Richard R. Stearns

[57] ABSTRACT

A disk-shaped gauge of molded plastic has raised hubs at both sides with a surrounding disk providing support faces around the hubs. The hubs have successive chord lines at equal intervals which are serrated to form linear gauge edges, the number of serrations per 20 mm length of the gauge edges being graduated from 8 to 16 and fractions thereof as are marked on the hubs. Stamps placed on the support faces are checked for mating engagement with the gauge edges to determine the gauge of the serrations of the stamps.

The classification of stamps by philaterists require the determination of the numbers of serrations along the edges per a 20 mm unit length since this is important in ascertaining the value and character of the stamps.

5 Claims, 3 Drawing Figures

STAMP GAUGE

An object of the present invention is to provide an inexpensive and accurate gauge of compact design which enables a user to check easily the number of serrations per unit length along the edges of the stamps.

Another object is to provide such gauge which has twenty different gauge edges for checking the number of serrations through a range from 8 to 16 and fractions thereof.

Another object is to provide such gauge in a disk form having a raised hub at each side with ten successive gauge edges at 36° intervals and having a surrounding support face enabling a stamp placed on the face to be moved slidably to determine easily and quickly the gauge edge to which the serrated edge of the stamp conforms.

Another object is to provide such gauge which is molded of plastic to enable the gauges to be produced inexpensively and with absolute accuracy.

These and other objects of the invention will be apparent from the following description and the appended claims with reference to the accompanying drawings, of which:

Figure 1:
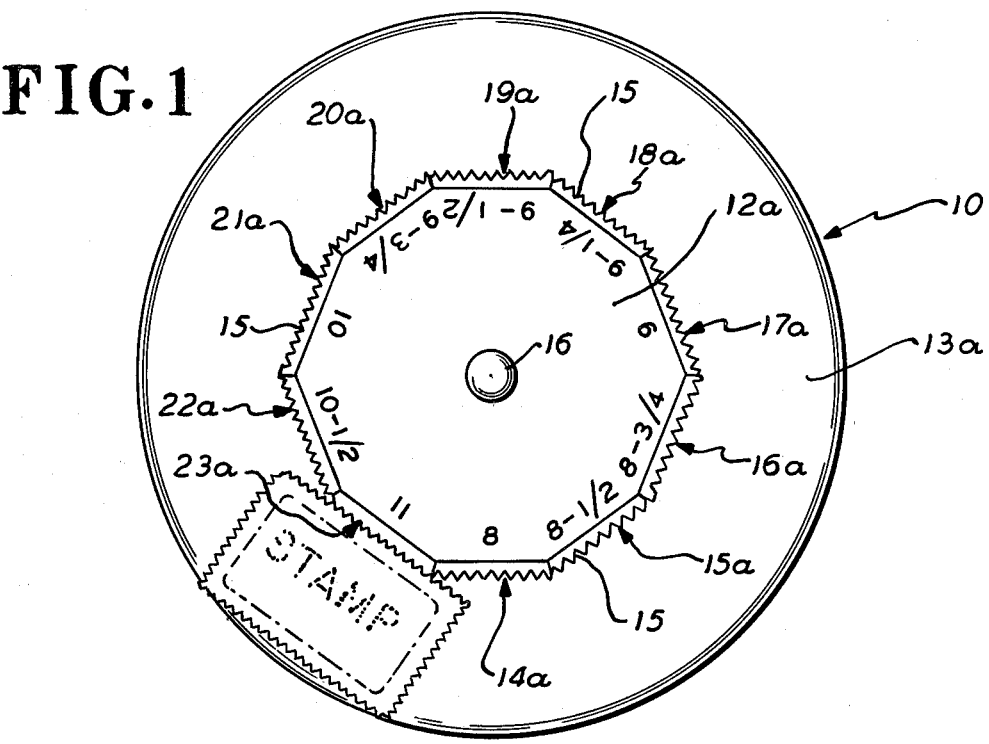
FIG. 1 is a plan view of one side of the gauge showing ten successive gauge edges from numbers of 8 to 11 and fractions thereof, as marked.
Figure 2:
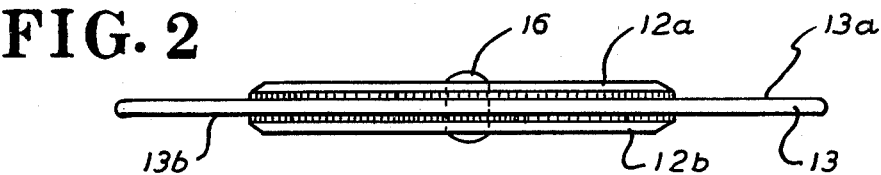
FIG. 2 is an edge view of the gauge.
Figure 3:
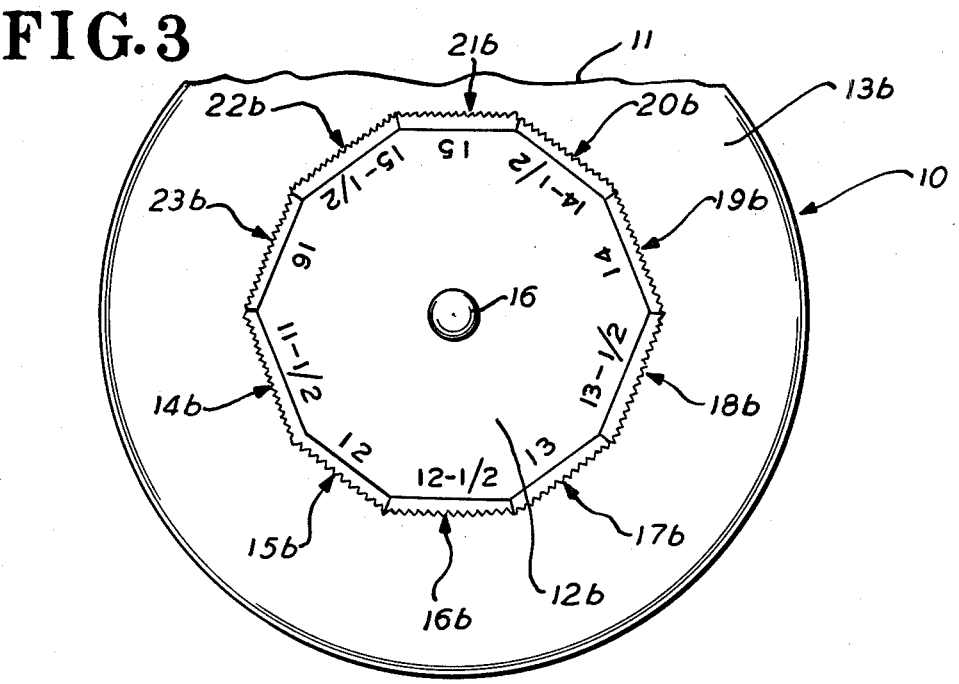
FIG. 3 is a plan view of the other side showing also ten successive gauge edges but of numbers from $11\frac{1}{2}$ to 16 and fractions thereof, as marked.

The gauge 10 shown in the drawings to illustrate the invention comprises a disk 11 having raised hubs 12a and 12b at its opposite sides, and a disk 13 around the hubs to provide a support or guide face 13a extending from the hub 12a and a guide face 13b extending from the hub 12b. The periphery of the hub 12a comprises ten chord lines of equal length at 36° intervals about the center of the hub, and the periphery of the hub 12b has correspondingly ten similar chord lines. The chord lines are bevelled down to a thickness of approximately 0.060" and are provided with serrations 15 of different numbers per 20 mm length to provide successive gauge edges 14a to 23a on the hub 12a graduated around the hub by numbers 8, $8\frac{1}{4}$, $8\frac{3}{4}$, 9, $9\frac{1}{4}$, $9\frac{1}{2}$, $9\frac{3}{4}$, 10, $10\frac{1}{2}$ and 11. Likewise, the hub 12b has successive gauge edges 14b to 23b graduated by numbers $11\frac{1}{2}$, 12, $12\frac{1}{2}$, 13, $13\frac{1}{2}$, 14, $14\frac{1}{2}$, 15, $15\frac{1}{2}$ and 16. These numbers are imprinted in the hubs along the respective gauge edges.

In use, one can tell by sight to within three gauge edges to which the serrations of a particular stamp will conform. Upon placing a stamp on the respective support or guide surface leading to the selected gauge edges, one can by trial and error slide the stamp edge against one or another of the gauge edges until an exact engagement is obtained. Usually this can be done on the first trial once one sees the stamp in juxtaposition to gauge edges. The number imprinted at the selected gauge edges then shows the number of serrations along the edge of the stamp per a 20 mm length thereof.

By way of example, the hub diameters are preferably $2\text{-}\frac{1}{2}''$ and the overall diameter of the gauge is 5" leaving a guide surface of $1\text{-}\frac{1}{4}''$ extending from each hub.

By way of example, the disk portion and the hub members may be formed separately as by molding so that the serrations in the hubs can be formed precisely to extend completely to the guide surfaces of the disk when they are assembled. An integral assembly of the hubs and disk in concentric relation to each other is made by a suitable ornamental rivet 16.

The embodiment of my invention herein shown and described is intended to be illustrative and not necessarily limitative of my invention since the same is subject to changes and modifications without departure from the scope of the invention, which I endeavor to express by the following claims.

I claim:

1. A stamp gauge comprising a disk-shaped member having a raised hub and a surrounding disk providing a guide surface leading to the edge of the hub, wherein said edge is shaped to have a series of chord lines serrated by different numbers of serrations per unit length to form a series of different gauge edges about the hub whereby to enable a determination of the numbers of serrations per unit length in the edge of a stamp by slidably moving the stamp on said guide surface selectively into contact with said gauge edges until an exact engagement is obtained, and wherein the number of serrations per unit length for each gauge edge is imprinted in the hub at the respective gauge edge.

2. The stamp gauge set forth in claim 1 wherein said disk-shaped member has a similar hub and guide surface on its other side, and the gauge edges are graduated progressively proceeding around the hub on one side of the gauge and continuing progressively on proceeding around the hub on the other side.

3. The gauge set forth in claim 2 wherein the number of serrations per 20 mm length of the successive gauge edges of said other side are graduated from $11\frac{1}{2}$ to 16 and fractions thereof.

4. The gauge set forth in claim 1 wherein said hub has ten chord lines serrated to provide ten successive gauge edges, and the numbers of serrations per 20 mm length of the successive gauge edges are graduated from 8 to 11 and fractions thereof.

5. The gauge set forth in claim 1 wherein a plain disk member and a hub member are formed separately with the latter having a series of chord edges serrated to form respective gauge edges, and wherein the disk and hub members are thereupon secured firmly together in concentric relation to each other.

* * * * *